(12) United States Patent
Kayukawa et al.

(10) Patent No.: US 8,950,563 B2
(45) Date of Patent: Feb. 10, 2015

(54) TRANSMISSION

(75) Inventors: Norio Kayukawa, Konan (JP); Shiro Ogami, Kariya (JP); Hiroyuki Kato, Okazaki (JP)

(73) Assignee: Aisin Ai Co., Ltd., Nishio-shi (JP)

( * ) Notice: Subject to any disclaimer, the term of this patent is extended or adjusted under 35 U.S.C. 154(b) by 0 days.

(21) Appl. No.: 14/343,594

(22) PCT Filed: Sep. 11, 2012

(86) PCT No.: PCT/JP2012/073226
§ 371 (c)(1),
(2), (4) Date: May 2, 2014

(87) PCT Pub. No.: WO2013/039074
PCT Pub. Date: Mar. 21, 2013

(65) Prior Publication Data
US 2014/0231212 A1    Aug. 21, 2014

(30) Foreign Application Priority Data

Sep. 13, 2011 (JP) ................................. 2011-199823

(51) Int. Cl.
*F16H 63/34* (2006.01)
*B60T 1/06* (2006.01)
*B60T 1/12* (2006.01)
*B60T 1/00* (2006.01)

(52) U.S. Cl.
CPC ... *B60T 1/12* (2013.01); *B60T 1/06* (2013.01); *B60T 1/005* (2013.01); *F16H 63/3433* (2013.01); *F16H 63/3416* (2013.01)
USPC ......................... 192/219.5; 188/31; 74/577 S

(58) Field of Classification Search
CPC .................................................... F16H 63/3425
USPC ........................................................ 192/219.5
See application file for complete search history.

(56) References Cited

U.S. PATENT DOCUMENTS 2,875,856 A * 3/1959 Mrlik et al. ..................... 188/69
4,487,302 A * 12/1984 Morimoto et al. ......... 192/219.5
(Continued)

FOREIGN PATENT DOCUMENTS

| JP | 7 32990 | 2/1995 |
| JP | 2007 326438 | 12/2007 |
| JP | 2009 143363 | 7/2009 |

(Continued)

OTHER PUBLICATIONS

International Search Report Issued Nov. 6, 2012 in PCT/JP12/073226 Filed Sep. 11, 2012.

*Primary Examiner* — Richard M. Lorence
(74) *Attorney, Agent, or Firm* — Oblon, Spivak, McClelland, Maier & Neustadt, L.L.P.

(57) ABSTRACT

A transmission is provided with an engagement member rotationally moved between an engagement position where the engagement member is engaged with a parking gear to restrict the rotation of a drive shaft, and an engagement release position where the engagement member is disengaged from the parking gear to permit the rotation of the drive shaft; a support member provided in a case to be distanced from a rotational axis of the engagement member; and a pair of urging members urging the engagement member in a direction in which the engagement member rotationally moves from the engagement position toward the engagement release position, and supported on the support member respectively at symmetrical positions that are on both sides of the engagement member in a rotational axis direction of the engagement member.

6 Claims, 2 Drawing Sheets

(56) References Cited

U.S. PATENT DOCUMENTS

| | | | |
|---|---|---|---|
| 5,630,339 A * | 5/1997 | Tuday | 74/577 R |
| 5,964,335 A * | 10/1999 | Taniguchi et al. | 192/219.5 |
| 2011/0005891 A1 | 1/2011 | Hongawara et al. | |
| 2014/0083218 A1 | 3/2014 | Fukaya et al. | |

FOREIGN PATENT DOCUMENTS

JP  2011 020469  2/2011

* cited by examiner

TRANSMISSION

TECHNICAL FIELD

The present invention relates to a transmission that is provided with a parking mechanism for holding a stopping state of a vehicle.

BACKGROUND ART

In transmissions that change the speed of the rotation outputted by a driving source such as an engine, there is one provided with a parking mechanism for holding the stopping state after a vehicle is stopped. For example, Patent Document 1 discloses a parking mechanism that restricts the rotation of an output shaft by engaging a claw portion of a parking pawl with a parking gear secured on an output shaft of a transmission The parking mechanism like this is required to separate the parking pawl from the parking gear for the purpose of turning to an unlocked state in which the rotation of the output shaft is not restricted. For this reason, in the parking mechanism in Patent Document 1, a torsion spring is arranged around the outer periphery of a support shaft rotatably supporting the parking pawl and urges the parking pawl in a releasing direction by its elastic force.

However, in this construction, the position at which the torsion spring urges the parking pawl becomes a position being relatively close to the rotational axis of the parking pawl, so that a strong elastic force is required for the torsion spring. Consequently, a load against the torsion spring in assembling the parking mechanism becomes large, thereby arousing an anxiety that the working property in assembling is degraded. Further, with an increase in elastic force, the torsion spring becomes larger in diameter, and thus, the parking mechanism is liable to become larger in dimension as a whole. To avoid this, for example, Patent Document 2 discloses a parking mechanism supporting a torsion spring by a pin that is arranged to be distanced from the rotational axis of a parking pawl. With this construction, because the position at which the torsion spring urges the parking pawl is distanced from the rotational axis of the parking pawl, it is considered that a torsion spring being relatively weak in elastic force can be used.

PRIOR ART DOCUMENTS

Patent Documents

Patent Document 1: JP2007-326438 A
Patent Document 2: JP2011-020469 A

SUMMARY OF THE INVENTION

Problem to be Solved by the Invention

Transmissions have been required to be made smaller for the purpose of improving the nature of being mounted on a vehicle. Thus, it may be the case that a parking mechanism of the transmission is subjected to restrictions on the position arranged inside the transmission as well as on the dimensions. Because of such restrictions, the dead load of the parking pawl may influence the operation of the parking mechanism where a claw portion of the parking pawl is arranged to be located over a parking gear, as is the case of the parking mechanism in Patent Document 2 for example. Therefore, in order to operate the parking mechanism properly, it becomes required to increase the elastic force of the torsion spring. This arouses anxieties about the degradation in the working property in assembling, increases in dimensions of the parking mechanism and the like.

The present invention has been made taking the foregoing problems into consideration, and an object thereof is to provide a transmission having a parking mechanism capable of securing a further stable operation and being downsized.

Solution to the Problem

A transmission according to a first aspect comprises a case; a drive shaft rotatably supported in the case; a parking gear secured on the drive shaft; an engagement member rotatably supported in the case and rotationally moved between an engagement position where the engagement member is engaged with the parking gear to restrict the rotation of the drive shaft, and an engagement release position where the engagement member is disengaged from the parking gear to permit the rotation of the drive shaft; a support member provided in the case to be distanced from a rotational axis of the engagement member; and a pair of urging members urging the engagement member in a direction in which the engagement member rotationally moves from the engagement position toward the engagement release position, and supported on the support member respectively at symmetrical positions that are on both sides of the engagement member in a rotational axis direction of the engagement member.

With the construction, the pair of urging member are supported on the support member at the symmetrical positions that are on the both sides of the engagement member in the rotational axis direction of the engagement member. Thus, the pair of urging members can be set to have the required elastic force as a whole. By doing so, individual elastic forces of the respective urging members can be set to be weak. Therefore, the urging members can be given the elastic force required for the operation of the parking mechanism, and at the same time, the downsizing can be realized in the radial direction of the drive shaft in comparison with a construction that a single urging member undertakes the required elastic force as is the case of the prior art or another construction that urging members are juxtaposed at plural places. Further, since it is possible to arrange the pair of urging members individually in assembling the parking mechanism, the load required in assembling each of the urging members can be reduced, so that the working property in assembling can be improved.

In the transmission according to a second aspect, the support member is supported by an arm portion provided on an inner side of the case, at a portion that is located at the middle between the pair of urging members.

In the parking mechanism in the prior art, a construction is taken that a support member supporting an urging member is supported by a case at, for example, both end portions thereof. Thus, the case is required to be formed with bosses at portions where the both end portions of the support member are located. On the contrary, in the present invention, with the aforementioned construction taken, the position that is taken as a reference in arranging the pair of urging members and the position where the support member is supported by the case come to agreement in the rotational axis direction. Thus, it is possible to reliably support the support member without supporting the both end portions of the same by the bosses or the like. Therefore, it is not required to form the bosses as is done in the prior art, and further, it can be realized to reduce the required space.

In the transmission according to a third aspect, the urging members are torsion springs having coil portions, and the support member has a shaft-like portion that passes through inner peripheral sides of the coil portions to coaxially support the pair of urging members.

With the construction like this, the pair of urging members being the torsion springs are coaxially supported on the shaft-like portion of the support member. Thus, the engagement member is in contact with respective one end portions of the pair of torsion springs and is urged in a direction in which it is rotationally moved from the engagement position toward the engagement release position. Then, since the coil portions of such torsion springs are arranged coaxially, it is possible to downsize the parking mechanism further reliably in comparison with a construction that a plurality of urging members are juxtaposed.

The transmission according to a fourth aspect has a restriction member provided on the outer peripheral side of the shaft-like portion and being in contact with an end surface of the arm portion on one side in the rotational axis direction with the support member supported by the arm portion of the case, to restrict the movement of the support member toward the other side in the rotational axis direction, and an annular flange portion formed at an end portion of the shaft-like portion on the other side in the rotational axis direction.

With the construction like this, the support member is restricted by the restriction member from moving toward the other side in the rotational axis direction. Further, the support member is formed with the flange portion at the end portion of the shaft-like portion. That is, one of the pair of urging members is interposed between the arm portion of the case and the flange portion. Then, the other of the pair of urging members is interposed between the end portion on one side in the rotational axis direction of the shaft-like portion and the restriction member. Thus, since the pair of urging members can urge the engagement member to be well balanced, it is possible to make the operation further stable. Further, since the arm portion can always support the portion that is located at the middle between the urging members, it is possible to provide the support member in the case 10 further stably.

In the transmission according to a fifth aspect, the pair of urging members are set to be mutually equal in elastic force.

The pair of urging member are arranged at the symmetrical positions that are on the both sides of the engagement member in the rotational axis direction of the engagement member. Thus, where the pair of urging members are set to be mutually equal in elastic force as mentioned above, the maximum dimensions of each urging member can be diminished in obtaining the total elastic force required for the parking mechanism, and thus, downsizing can be realized as a whole. Further, since the pair of urging members can urge the engagement member to be well balanced, it is possible to make the operation further stable.

The transmission according to a sixth aspect is further provided with a cover member covering an opening portion of the case and supporting an end portion of the support member on either one side in the rotational axis direction.

With the construction like this, the support member is supported by the cover member that covers the opening portion of the case, at an end portion of on one side in the rotational axis direction of the engagement member. Although the support member is provided to be supported by the case, the end portion on one side, for example, is supported supplementarily by the cover member, so that the support member can be secured to the case further reliably. Therefore, since the support member can support the pair of urging members more reliably, it is possible to make the operation of the parking mechanism further stable.

EMBODIMENT FOR PRACTICING THE INVENTION

Hereinafter, with the reference to drawings, description will be made regarding an embodiment concretizing a transmission of the present invention.

<Embodiment>

(Construction of Transmission 1)

Figure 1:
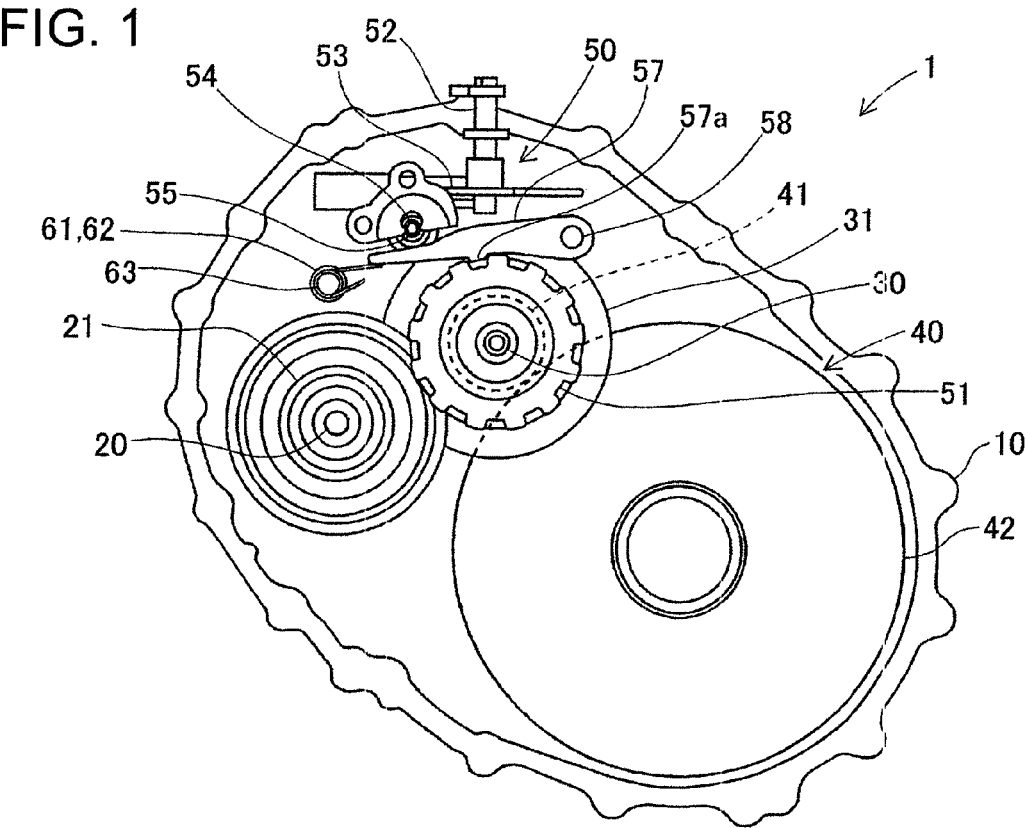
[FIG. 1] is a construction view of a transmission 1 in an embodiment viewed in an axial direction and showing some of gears.

The construction of the transmission 1 in the present embodiment will be described with reference to FIGS. 1-3. The transmission 1 is a mechanical transmission mounted on a vehicle and constitutes forward and backward speed change stages by a plurality of speed change gears supported on rotational shafts. As shown in FIG. 1, the transmission 1 is provided with a case 10, a rear retainer 12, an input shaft 20, an output shaft 30 (corresponding to "drive shaft" in the present invention), a differential 40 and a parking mechanism 50.

The case 10 supports the rotational shafts through a plurality of bearings and houses the plurality of gears arranged on the rotational shafts and the parking mechanism 50. The case 10 has an arm portion 11 and the rear retainer 12. The arm portion 11 is provided on an inner side of the case 10 to extend toward the parking mechanism 50. As shown in FIG. 3, the arm portion 11 is formed with a through hole 11a penetrating in the rotational shaft direction. The rear retainer 12 is a cover member covering an opening portion of the case 10 and is secured to the case 10 by being fastened with bolts. Further, the rear retainer 12 is formed with a cylindrical recess portion 12a extending in the axial direction of the rotational shafts, on an inner side surface facing the inside of the transmission 1.

The input shaft 20 is a rotational shaft that takes a shaft-like shape and that is rotatably supported by the case 10 through bearings. The input shaft 20 is connected to an engine being a driving source of the vehicle through a clutch mechanism (not shown) and has a driving force inputted thereto. As shown in FIG. 1, the input shaft 20 supports speed change gears, on an input side including an input gear 21, of gear pairs constituting the plurality of gear change stages. The input gear 21 is press-fitted on an external spline formed on the outer peripheral surface of the input shaft 20 and is in meshing with a speed change gear on an output side supported on the output shaft 30 to constitute a predetermined gear change stage.

The output shaft 30 is a rotational shaft that takes a shaft-like shape and that is rotatably supported by the case 10 through bearings. As shown in FIG. 1, the output shaft 30 supports speed change gears, on the output side including an output gear 31, of the gear pairs constituting the plurality of gear change stages. Then, the output shaft 30 outputs a driving force that is changed in speed by a predetermined speed change stage through the differential 40. The output gear 31 is rotatably supported relative to the output shaft 30 and is in meshing with a speed change gear on the input side supported on the input shaft 20. Then, the output gear 31 is selectively connected to the output shaft 30 by a shift mechanism (not shown) and constitutes a predetermined speed change stage together with a speed change gear on the input side.

The differential 40 is a differential gear in the vehicle. As shown in FIG. 1, the differential 40 has a final drive gear 41 and a ring gear 42. The final drive gear 41 is press-fitted on an external spline formed on the outer peripheral surface of the output shaft 30 and is fixedly connected to the output shaft 30. The ring gear 42 is rotatably supported relative to the case 10 and is connected to driving wheels through drive shafts (no: shown) and operates together with the rotation of the driving wheels. Further, the ring gear 42 is always in meshing with the final drive gear 41 and is held rotationally connected to the output shaft 30.

The parking mechanism 50 is a mechanism that restricts the rotation of the output shaft 30 being the drive shaft when the vehicle is stopped, to restrict the rotation of the driving wheels operating together with the ring gear drivingly connected to the output shaft 30 and to hold the stopping state of the vehicle. The parking mechanism 50 is mainly composed of a parking gear 51, a manual shaft 52, a manual valve lever 53, a rod 54, a cam 55, a cam spring 56, a parking pawl 57, a pawl support shaft 58, a pair of torsion springs 61, 62 and a spring support shaft 63.

The parking gear 51 is formed with a plurality of external teeth on the outer peripheral surface thereof and is press-fitted on an external spline formed on the outer peripheral surface of the output shaft 30 to be secured on the output shaft 30. As shown in FIG. 1, the manual shaft 52 is a shaft-like member extending in the vertical direction of the transmission 1 and is rotatably supported by the case 10. The manual shaft 52 is turned about the center axis to take an angle corresponding to a shift position of the vehicle. The manual valve lever 53 is secured to a lower part of the manual shaft 52 to be perpendicular to the center axis of the manual shaft 52. With this construction, the manual valve lever 53 is turned bodily together with the turn of the manual shaft 52.

The rod 54 is a shaft-like member extending in a direction (the front-rear direction in FIGS. 1, 2 and the left-right direction in FIG. 3) being parallel to the rotational shafts of the transmission 1 and has its one end that is connected with the manual valve lever 53 to be able to rock. Thus, the rod 54 is moved in the extending direction of the rod 54 together with the turn of the manual valve lever 53 connected thereto. As shown in FIG. 3, the rod 54 is formed with an annular stopper 54a protruding radially from the outer peripheral surface thereof.

The cam 55 has a large diameter portion formed on one side in the axial direction of the rod 54 and a small diameter portion formed to extend from the larger diameter portion and to become gradually smaller toward the other side in the axial direction. Further, the cam 55 is formed with a cylindrical internal surface and is slidably provided on the rod 54 penetrating through the internal surface. The cam spring 56 is a coil-like compression spring and is interposed between the stopper 54a of the rod 54 and the cam 55 on the outer peripheral side of the rod 54. The cam spring 56 is secured to stopper 54a at one end portion and to the cam 55 at the other end portion. Thus, in the state that no load acts on the cam spring 56, the cam 55 is held to be spaced from the stopper 54a by the free length of the cam spring 56.

Figure 2:
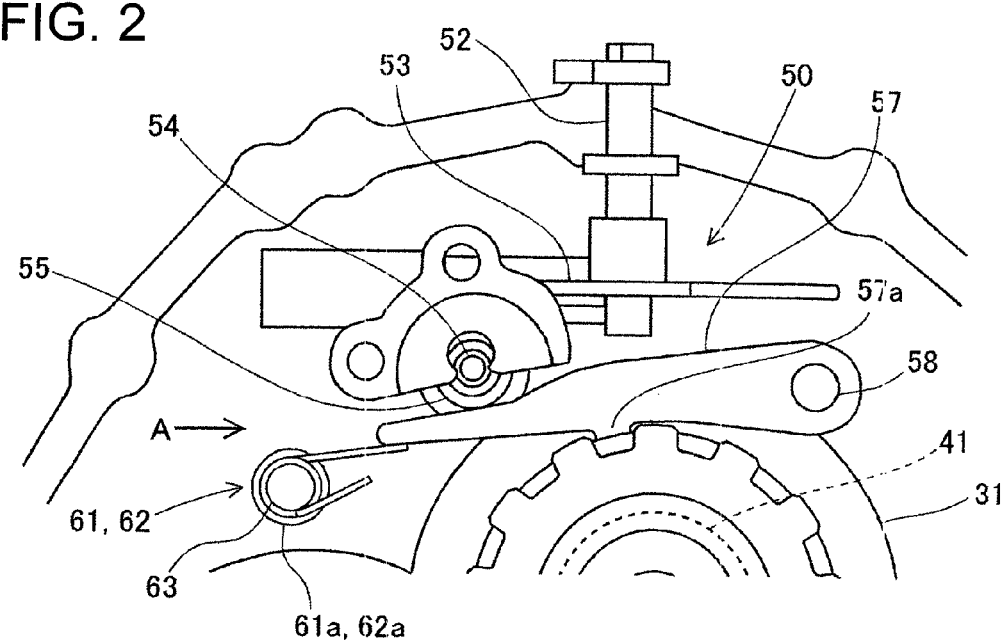
[FIG. 2] is an enlarged view of FIG. 1 showing a parking mechanism.

As shown in FIG. 2, the parking pawl 57 is rotatably supported by the case 10 through the pawl support shaft 58 and is formed to extend in a radial direction of the rotational axis. Further, the axial position of the parking pawl 57 is set to correspond to the axial position of the parking gear 51 in the case 10. The parking pawl 57 is formed with an engaging claw 57a that protrudes toward the output shaft 30 at the center portion in the longitudinal direction on an outer surface of the parking pawl 57 and that is engageable with the external teeth formed on the outer peripheral surface of the parking gear 51.

When turned toward one side about the pawl support shaft 58 as rotational axis, the parking pawl 57 is moved to an engagement position where the engaging claw 57a is engaged with the parking gear 51 to restrict the rotation of the output shaft being a drive shaft. Further, when turned toward the other side about the pawl support shaft 58 as rotational axis, the parking pawl 57 is moved to an engagement release position where the engaging claw 57a is disengaged from the parking gear 51 to permit the rotation of the output shaft 30. Like this, the parking pawl 57 is an engagement member that is rotationally moved between the aforementioned engagement position and engagement release position through the turn about the pawl support shaft 58 as rotational axis. The pawl support shaft 58 is a shaft-like member supported by the case 10 and supports the parking pawl 57 on the outer peripheral surface.

The pair of torsion springs 61, 62 are urging members formed with coil portions 61a, 62a and having elastic forces in the circumferential direction of the coil portions 61a, 62a. In the present embodiment, the elastic forces of the torsion springs 61, 62 are set to be equal with each other and to attain a required elastic force as a whole. Further, the torsion springs 61, 62 are arranged to be in contact with the lower side (the lower side in FIGS. 2 and 3) of an extreme end portion of the parking pawl 57 at respective one end portions and to be secured to the case 10 at the respective other end portions. Thus, the pair of torsion springs 61, 62 urge the parking pawl 57 in a direction (the upper direction in FIGS. 2 and 3) in which the parking pawl 57 is rotationally moved from the engagement position toward the engagement release position.

The parking pawl 57 is in contact with the outer peripheral surface of the rod 54 or the cam 55 at a back face portion (the upper side position in FIGS. 2 and 3) of the extreme end portion opposite to the position that is urged by the torsion springs 61, 62. That is, when the back face portion is in contact with the small diameter portion on the outer peripheral surface of the rod 54 or the cam 55, the parking pawl 57 is rotationally moved by the elastic forces of the torsion springs 61, 62 to the engagement release position. Further, when the back face portion is in contact with the large diameter portion on the outer peripheral surface of the cam 55, the parking pawl 57 is rotationally moved to the engagement position against the elastic forces of the torsion springs 61, 62.

The aforementioned pair of torsion springs 61, 62 are supported on the spring support shaft 63 respectively at symmetrical positions that are on both sides of the parking pawl 57 in the rotational axis direction (the left-right direction in FIG. 3) of the parking pawl 57. The spring support shaft 63 has a shaft-like portion 63a, an inserted portion 63b, a flange portion 63c and a snap ring 63d. The shaft-like portion 63a is a cylindrical member extending in the direction of the drive shaft of the transmission 1. As shown in FIG. 2, the spring support shaft 63 is a support member that is provided in the case 10 to be distanced from the rotational axis of the parking pawl 57 (the center axis of the pawl support shaft 58).

Figure 3:
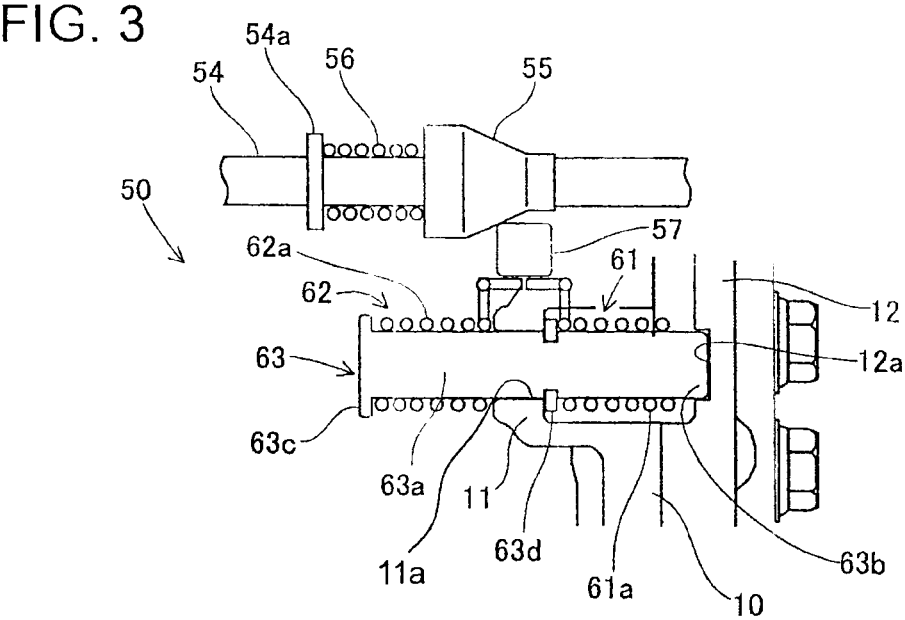
[FIG. 3] is a view in a direction of the arrow A in FIG. 2.

In more detail, as shown in FIG. 3, the spring support shaft 63 has the shaft-like portion 63a that passes through the through hole 11a of the arm portion 11 provided on the inner side of the case 10. Thus, the spring support shaft 63 is supported by the arm portion 11 of the case 10 at a portion that is located at the middle between the pair of torsion springs 61, 62. Then, the spring support shaft 63 is formed to take almost a symmetrical shape as a whole in the rotational axis direction with respect to the parking pawl 57. Therefore, in the present embodiment, the spring support shaft 63 is supported by the case 10 at the center portion in the axial direction.

Further, the shaft-like portion 63a of the spring support shaft 63 passes through the inner peripheral sides of the coil portions 61a, 62a of the torsion springs 61, 62 to support the torsion springs 61, 62 coaxially. Further, the inserted portion 63b of the spring support shaft 63 is a portion that is formed at an end portion on one side (the right side in FIG. 3) of the shaft-like portion 63a. The inserted portion 63b is set to have the outer diameter that is slightly smaller than an inner diameter of the recess portion 12a formed on the inner side surface of the rear retainer 12 and is inserted into the recess portion 12a. Thus, the rear retainer 12 supports the end portion on the one side of the spring support shaft 63.

The flange portion 63c of the spring support shaft 63 is an annular portion that is formed on an end portion on the other side (the left side in FIG. 3) of the shaft-like portion 63a and that radially protrudes from the outer peripheral surface of the shaft-like portion 63a. The flange portion 63c prevents the torsion spring 62 supported on the shaft-like portion 63a from coming off the same. Further, the snap ring 63d on the spring support shaft 63 is a restriction member fitted in an annular groove that is formed on the outer peripheral surface adjacent to the center portion in the axial direction of the shaft-like portion 63a, to restrict the axial movement of the spring support shaft 63. In more detail, the snap ring 63d is in contact with an end surface on one side (the right side in FIG. 3) in the rotational axis direction of the arm portion 11 with the spring support shaft 63 supported by the arm portion 11 of the case 10. Therefore, the snap ring 63d restricts the movement of the spring support shaft 63 toward the other side (the left side in FIG. 3) in the axial direction.

With the construction like this, of the pair of torsion springs 61, 62, the torsion spring 62 arranged on the flange portion 63c side is interposed between the arm portion 11 of the case 10 and the flange portion 63c. Further, of the pair of torsion springs 61, 62, the torsion spring 61 arranged on the rear retainer 12 side is interposed between the rear retainer 12 having the inserted portion 63b inserted therein and the snap ring 63d. Thus, the parking pawl 57 is urged by respective one end portions of the pair of torsion springs 61, 62 at the portions that are symmetrical in the rotational axis direction.

(Operation of Parking Mechanism 50 in Transmission 1)

Description will be made regarding the operation of the parking mechanism 50 taking the construction like this. As mentioned above, the parking pawl 57 is always urged by the pair of torsion springs 61, 62 to be rotationally moved in a direction from the engagement position toward the engagement release position. Then, for example, when the shift of the vehicle is manipulated to a P-range by the driver, the manual shaft 52 is turned by the predetermined angle. As a result, the manual valve lever 53 is turned, and together with this, the rod 54 is moved to one side in the axial direction. Then, the axial movement of the rod 54 brings the cam 55 into a state to press the back face portion of the parking pawl 57. At this time, where the parking gear 51 is in a phase being engageable with the engaging claw 57a, the parking pawl 57 is rotationally moved to the engagement position against the elastic forces of the torsion springs 61, 62 and restricts the rotation of the parking gear 51. Thus, the parking mechanism 50 turns into a lock state.

Further, when the parking gear 51 is in another phase being not engageable with the engaging claw 57a, the engaging claw 57a is in the state that it is in contact with a tooth end surface of one of the external teeth of the parking gear 51. This causes the stopper 54a of the rod 54 to come close to the cam 55 to compress the cam spring 56. Subsequently, when the vehicle is given a forward/backward force by the influence of a slope surface or the like, the driving wheels are rotated to cause the parking gear 51 to rotate to a phase being engageable with the engaging claws 57a. Thus, the cam 55 being urged by the cam spring 56 presses the back face portion of the parking pawl 57, whereby the parking pawl 57 is rotationally moved to the engagement position. In this way, the parking mechanism 50 brings the engaging claw 57a of the parking pawl 57 into the engagement with the parking gear 51, so that the lock state of restricting the rotation of the drive shaft is brought about to keep the stopping state of the vehicle.

Thereafter, when the shift of the vehicle is manipulated from the P-range to another range, the manual shaft 52 is turned by the predetermined angle in the opposite direction. Thus, the manual valve lever 53 is turned, and together with this turn, the rod 54 is moved toward the other side in the axial direction. Then, with the axial movement of the rod 54, the cam 55 is brought into a state that it does not press the back face portion of the parking pawl 57. Thus, the parking pawl 57 is rotationally moved by the elastic forces of the torsion spring 61, 62 to the engagement release position, whereby the parking mechanism 50 is brought into an unlocked state that the rotation of the parking gear 51 and the drive shaft is permitted.

(Effects of Transmission 1)

According to the transmission 1 provided with the parking mechanism 50 taking the aforementioned construction, the following effects can be attained. In the embodiment, the pair of torsion springs 61, 62 are supported on the spring support shaft 63 at the symmetrical positions that are on both sides of the parking pawl 57 in the rotational axis direction of the parking pawl 57. Thus, the pair of torsion springs 61, 62 can be set to have the required elastic force as a whole. As a result, each of the torsion springs 61, 62 can be set to be weak in the elastic force individually. Accordingly, it is possible to make the torsion springs 61, 62 have the elastic force required for the operation of the parking mechanism 50 and to downsize the transmission 1 in the radial direction of the drive shaft in comparison with a construction that obtains the required elastic force by a single urging member as is the case of the prior art and another construction wherein urging members are arranged at plural places in a parallel.

Further, because it is possible to arrange the pair of torsion springs 61, 62 individually in assembling the parking mechanism 50, the load required in assembling each spring becomes small, whereby the working property in assembling can be improved. Further, the spring support shaft 63 supporting the pair of torsion springs 61, 62 is provided to be distanced from the rotational axis of the parking pawl 57. Thus, because the position where the torsion springs 61, 62 urge the parking pawl 57 can be set to a position that is distanced from the rotational axis of the parking pawl 57, it is possible to set the torsion springs 61, 62 to a relatively weak elastic force.

Further, in the present embodiment, the construction is taken that the spring support shaft 63 is supported by the arm portion 11 of the case 10 at the portion being located at the middle between the pair of torsion springs 61, 62. In a construction wherein a case supports both end portions of a support member supporting an urging member in a parking mechanism in the prior art, it is required to form bosses at portions where the both end portions of the support member are located. On the contrary, in the present invention, with the aforementioned construction taken, the position that is taken as a reference in arranging the pair of torsion springs 61, 62 and the position where the spring support shaft 63 is supported by the case 10 come to agreement in the rotational axis direction. Thus, it is possible to reliably support the spring support shaft 63 without supporting the both end portions of the same by the bosses or the like. Therefore, it is not required to form the bosses as is done in the prior art, and further, it can be realized to reduce the required space.

Moreover, the parking mechanism 50 takes the construct on that uses the torsion springs 61, 62 as a pair of urging members and that coaxially supports the coil portions 61a, 62a on the shaft-like portion 63a of the spring support shaft 63. Thus, it is possible to downsize the parking mechanism 50 further reliably in comparison with a construction that juxtaposes a plurality of urging members as is done in the prior art.

The spring support shaft 63 is configured to have the flange portion 63c and the snap ring 63d. That is, the pair of torsion springs 61, 62 are arranged to put the arm portion 11 therebetween, so that they are interposed respectively between the arm portion 11 and the rear retainer 12 and between the arm portion 11 and the flange portion 63c. Thus, since the pair of torsion springs 61, 62 can urge the parking pawl 57 to be well balanced, it is possible to make the operation further stable. Further, since the arm portion 11 can always support the portion that is located al the middle between the torsion springs 61, 62, it is possible to provide the spring support shaft 63 in the case 10 further stably.

Further, the construction is taken that the pair of torsion springs 61, 62 are set to have mutually equal elastic forces in addition to being arranged at the symmetrical positions that are on the both sides of the parking pawl 57 in the rotational axis direction of the parking pawl 57. Thus, since the pair of torsion springs 61, 62 can have the maximum dimensions for each made small in obtaining the total elastic force required for the parking mechanism 50, the downsizing can be realized as a whole. Further, since the pair of torsion springs 61, 62 can urge the parking pawl 57 to be well balanced, it is possible to secure the stability in operation.

Moreover, the construction is taken that the spring support shaft 63 is supported with itself inserted into the recess portion 12a of the rear retainer 12 at the inserted portion 63b thereof which is formed at the end portion on one side in the rotational axis direction of the parking pawl 57. Although provided to be supported by the case 10, the spring support shaft 63 can be reliably secured to the case 10 because the end portion on one side is supplementally supported by the rear retainer 12. Therefore, since the spring support shaft 63 can support the pair of torsion springs 61, 62 further reliably, it is possible to make the operation of the parking mechanism 50 further stable.

<Modified Forms of Embodiment>

In the present embodiment, the pair of urging member are constituted by the torsion springs 61, 62 having the coil portions 61a, 62a. On the contrary, for example, coiling springs, leaf springs or the like are applicable as those that by the elastic forces, urge the parking pawl 57 being the engagement member to rotationally move from the engagement position to the engagement release position. Further, the pair of torsion springs 61, 62 are set to be mutually equal in elastic force. On the contrary, where consideration is taken into restrictions on, for example, the space which enables the parking mechanism 50 to be arranged in the interior of the case 10, there may be taken a construction that the elastic forces are set unequally.

Further, the parking gear 51 of the parking mechanism 50 is secured on the output shaft 30 as a drive shaft. On the contrary, there can be taken another construction that the parking gear 51 is secured on another rotational shaft such as, for example, the input shaft 20 or the like. Furthermore, where the transmission is of a dual clutch type that performs speed changes by selectively switching a plurality of input shafts and a plurality of output shafts, there may be taken a construction that the parking gear 51 is provided on either of the rotational shafts. However, in the construction that the parking gear 51 is provided on any of the rotational shafts, it is required that a rotational shaft with the parking gear 51 secured thereon be in rotational connection to operate together with the rotation of the driving wheels when the shift of the vehicle is manipulated to the P-range. Even in this construction, the same effects as those in the embodiment can be achieved.

The invention claimed is:

1. A transmission comprising:
   a case;
   a drive shaft rotatably supported in the case;
   a parking gear secured on the drive shaft;
   an engagement member rotatably supported in the case and rotationally moved between an engagement position where the engagement member is engaged with the parking gear to restrict the rotation of the drive shaft, and an engagement release position where the engagement member is disengaged from the parking gear to permit the rotation of the drive shaft;
   a support member provided in the case to be distanced from a rotational axis of the engagement member; and
   a pair of urging members urging the engagement member in a direction in which the engagement member rotationally moves from the engagement position toward the engagement release position, and supported on the support member respectively at symmetrical positions that are on both sides of the engagement member in a rotational axis direction of the engagement member.

2. The transmission in claim 1, wherein the support member is supported by an arm portion provided on an inner side of the case, at a portion that is located at the middle between the pair of urging members.

3. The transmission in claim 2, wherein:
   the urging members are torsion springs having coil portions; and
   the support member has a shaft-like portion that passes through inner peripheral sides of the coil portions to coaxially support the pair of urging members.

4. The transmission in claim 3, further comprising:
   a restriction member provided on the outer peripheral side of the shaft-like portion and being in contact with an end surface of the arm portion on one side in the rotational axis direction with the support member supported by the arm portion of the case, to restrict the movement of the support member toward the other side in the rotational axis direction; and
   an annular flange portion formed at an end portion of the shaft-like portion on the other side in the rotational axis direction.

5. The transmission in claim 1, wherein the pair of urging members are set to be mutually equal in elastic force.

6. The transmission in claim 1, further comprising a cover member covering an opening portion of the case and supporting an end portion of the support member on either one side in the rotational axis direction.

* * * * *